(12) United States Patent
Jo et al.

(10) Patent No.: US 12,269,531 B2
(45) Date of Patent: Apr. 8, 2025

(54) MOVING BODY

(71) Applicants: Hyundai Motor Company, Seoul (KR); Kia Corporation, Seoul (KR); MOBINN INC., Suwon-si (KR)

(72) Inventors: Sun Myoung Jo, Ansan-si (KR); Jin Choi, Seoul (KR); Hoon Chung, Hwaseong-si (KR)

(73) Assignees: Hyundai Motor Company, Seoul (KR); Kia Corporation, Seoul (KR); MOBBIN Inc., Suwon-si (KR)

( * ) Notice: Subject to any disclaimer, the term of this patent is extended or adjusted under 35 U.S.C. 154(b) by 151 days.

(21) Appl. No.: 18/295,570

(22) Filed: Apr. 4, 2023

(65) Prior Publication Data

US 2024/0109590 A1    Apr. 4, 2024

(30) Foreign Application Priority Data

Oct. 4, 2022 (KR) .......................... 1020220126454

(51) Int. Cl.
*B62D 21/14* (2006.01)
(52) U.S. Cl.
CPC .................................. *B62D 21/14* (2013.01)
(58) Field of Classification Search
CPC ........ B62D 21/14; B62D 63/02; B60B 19/04; B60B 1/042; B60B 27/0015; B60B 27/065; B60B 2320/12; B60B 2320/50; B60B 2900/551; B60K 7/0007; B60K 2007/0038; B60K 2007/0092; F16H 21/44

USPC .......................................................... 280/638
See application file for complete search history.

(56) References Cited

U.S. PATENT DOCUMENTS

| | | | |
|---|---|---|---|
| 6,793,248 B1 * | 9/2004 | Sung | B62D 21/183 180/209 |
| 8,540,272 B1 * | 9/2013 | Vitale | B62D 47/003 280/638 |
| 11,505,004 B2 | 11/2022 | Jo et al. | |
| 2005/0067206 A1 * | 3/2005 | Trautman | B62D 21/14 180/209 |
| 2013/0068543 A1 * | 3/2013 | Kim | B62D 57/02 180/6.5 |
| 2013/0240274 A1 * | 9/2013 | Vitale | B62D 63/025 180/65.1 |
| 2020/0276865 A1 | 9/2020 | Jo et al. | |
| 2022/0388339 A1 | 12/2022 | Jo et al. | |
| 2023/0331038 A1 | 10/2023 | Jo et al. | |
| 2024/0034117 A1 * | 2/2024 | Panigrahi | B62D 21/14 |

(Continued)

FOREIGN PATENT DOCUMENTS

| | | | |
|---|---|---|---|
| CN | 108248312 A | * | 7/2018 |
| CN | 212022191 | | 11/2020 |
| CN | 112590910 | | 4/2021 |

(Continued)

*Primary Examiner* — James A English
(74) *Attorney, Agent, or Firm* — Fish & Richardson P.C.

(57) ABSTRACT

A moving body includes a body, and a wheel coupled to the body to be rotatable, and the body includes a first body part, a second body part connected to the first body part to be slid in a forward/rearward direction with respect to the first body part, a first coupling part formed in the first body part or the second body part, and a second coupling part coupled to the first coupling part and constrains sliding between the first body part and the second body part.

17 Claims, 12 Drawing Sheets

(56) References Cited

U.S. PATENT DOCUMENTS

| | | | |
|---|---|---|---|
| 2024/0075909 A1* | 3/2024 | Jo | B62D 61/10 |
| 2024/0208574 A1* | 6/2024 | Jo | B62D 21/14 |

FOREIGN PATENT DOCUMENTS

| | | | |
|---|---|---|---|
| CN | 113086012 A | * | 7/2021 |
| CN | 117508341 A | * | 2/2024 |
| GB | 963042 A | * | 7/1964 |
| JP | 3119539 | | 3/2006 |
| JP | 2015-521978 | | 8/2015 |
| JP | 2017-121822 | | 7/2017 |
| KR | 10-2010- 0069331 | | 6/2010 |
| KR | 10-2020- 0062695 | | 6/2020 |
| KR | 10-2020- 0105131 | | 9/2020 |
| KR | 10-2022- 0163785 | | 12/2022 |
| KR | 10-2023- 0147402 | | 10/2023 |
| WO | WO 2021/047680 | | 3/2021 |

* cited by examiner

MOVING BODY

CROSS-REFERENCE TO RELATED APPLICATION

This application claims the benefit of priority to Korean Patent Application No. 10-2022-0126454, filed in the Korean Intellectual Property Office, on Oct. 4, 2022, the entire contents of which are incorporated herein by reference.

TECHNICAL FIELD

The present disclosure relates to a moving body.

BACKGROUND

A moving body refers to an object that may move by using wheels or other means. For example, robot technologies may include moving bodies in various forms. To overcome a limit in a conventional wheel structure, a moving body may ascend and descend on stairs or steps through flexible tires, where the shapes of the wheel may be defamed.

In some cases, when the moving body ascends and descends the stairs or the steps, the heights or lengths of the stairs or the steps are not uniform depending on places, and thus it may be determined whether the moving body may or may not ascend and descend the stairs or the steps according to a forward/rearward length of the vehicle body.

In some cases, when an emergency situation, such as stop of an operation of a power source that supplies electric power to the moving body, occurs while the moving body ascends and descends on a slanted road, an accident may occur while the moving body is moved rearwards along the slant.

SUMMARY

The present disclosure describes a moving body, of which a forward/rearward length of a body can be adjusted.

The present disclosure further describes a moving body that can stop rotation of wheels when supply of electric power is stopped.

According to an aspect of the present disclosure, a moving body includes a body, and a wheel coupled to the body to be rotatable, and the body includes a first body part, a second body part connected to the first body part to be slid in a forward/rearward direction with respect to the first body part, a first coupling part formed in the first body part or the second body part, and a second coupling part coupled to the first coupling part and configured to constrain sliding between the first body part and the second body part.

In some implementations, the first coupling part can be any one of a hole, a recess, or a boss, and the second coupling part can include a shaft extending in a specific direction, a motor configured to rotate the shaft about the specific direction, and a coupler operated in conjunction with rotation of the shaft, including any one of a part inserted into the hole or the recess or a part, into which the boss is inserted, and configured to be coupled to or separated from the first coupling part according to forward/reverse rotation of the shaft.

In some implementations, the second coupling part can include a rotary member coupled to the shaft and rotated in conjunction with the rotation of the shaft, a link coupled to the rotary member to be rotatable and coupled to the coupler to be rotated, and a joint, to which the coupler is coupled to be rotatable, and fixedly coupled to the first body part or the second body part.

In some implementations, the shaft can be coupled to a lengthwise center of the rotary member, and a pair of links, a pair of couplers, and a pair of joints can be provided to be spaced apart from each other in a leftward/rightward direction, and the pair of links can be coupled to opposite lengthwise sides of the rotary member to be rotatable.

In some implementations, when the motor rotates the shaft, any one of the pair of couplers can be rotated in the same direction as that of the shaft, and the other one of the pair of couplers can be rotated in an opposite direction to that of the shaft.

In some implementations, the pair of links can be disposed to be dot-symmetrical to each other with respect to a center of the shaft, when viewed from a rear side.

In some implementations, the pair of couplers can be disposed to be line-symmetrical to each other with respect to an imaginary line extending from a center of the shaft in an upward/downward direction, when viewed from a rear side.

In some implementations, the moving body can further include a rotation constraining area disposed on a rotation radius side of the rotary member and configured to constrain rotation of the rotary member within a specific range.

In some implementations, the first coupling part can be formed in the second body part, the second body part can include an extension extending in the forward/rearward direction, and a protrusion protruding from the extension and extending in the forward/rearward direction, and the first body part can further include a guide, in which the protrusion is seated to be slid in the forward/rearward direction.

In some implementations, a plurality of extensions can be provided, and the first coupling part can be formed in at least any one of the plurality of extensions.

In some implementations, the second body part further can include a stopper coupled to a front distal end of the extension, and including an area that overlaps the guide when viewed along the forward/rearward direction, and the stopper can contact a front side of the guide to constrain reward movement of the extension when the extension is moved rearwards.

In some implementations, the body can further include a wheel motor, to which the wheel is coupled to be rotatable, and configured to rotate the wheel.

In some implementations, the wheel can include a hub having a plurality of insertion holes passing therethrough along a leftward/right direction and arranged along a circumferential direction thereof, and the body can further include wheel constraining part including a pin inserted into any one of the plurality of insertion holes or spaced part from the plurality of insertion holes in a leftward/rightward direction, and an operation member configured to move the pin in the leftward/rightward direction.

In some implementations, the wheel constraining part can operate the operation member such that the pin protrudes toward a direction that passes through the plurality of insertion holes when supply of a current is stopped.

In some implementations, the wheel can further include frame coupled to a rotary shaft of the wheel motor to be rotatable, and a spoke configured to surround the frame, and a center of the hub can correspond to a center of the frame when viewed along the leftward/rightward direction, and the hub can be spaced apart from the frame along a direction that faces the wheel motor in the leftward/rightward direction.

In some implementations, the operation member can be coupled to the wheel motor.

In some implementations, the wheel can further include a connection part connecting the frame and the spoke, a length of the connection part along a radial direction of the frame can be variable, and a length of the spoke along the radial direction of the frame can vary in correspondence of the length of the connection part along the radial direction of the frame.

DETAILED DESCRIPTION

Figure 1:
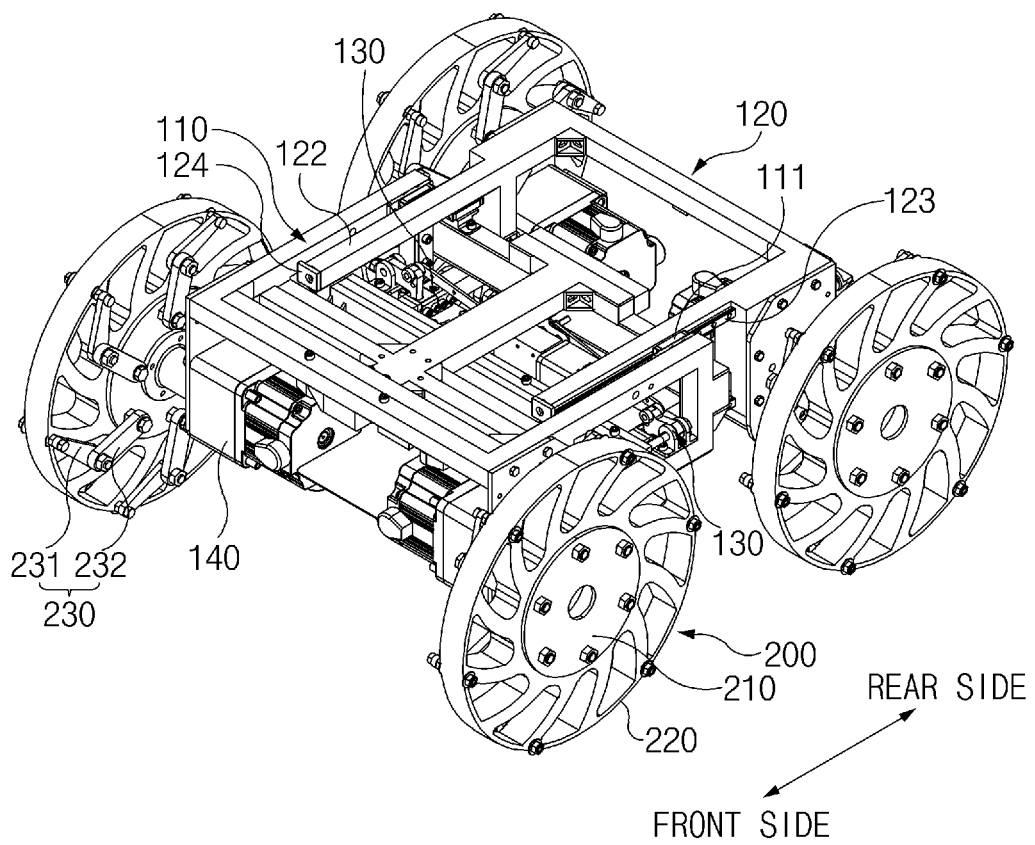
FIG. 1 is a perspective view illustrating an example of a moving body.

Hereinafter, example implementations of the present disclosure will be described in detail with reference to the exemplary drawings. In providing reference numerals to the components of the drawings, the same components can have the same reference numerals even if they are displayed on different drawings. Further, in the following description of the present disclosure, a detailed description of known functions and configurations incorporated herein will be omitted when it can make the subject matter of the present disclosure rather unclear.

Hereinafter, the moving body can mean a structure, such as a vehicle, which can be moved through a wheel 200 or other moving means. The moving body relates to a moving body that can ascend and descend on stairs or steps and in which rotation of wheels 200 can be stopped when supply of electric power is stopped.

In the specification, a forward/rearward direction, a leftward/rightward direction, and an upward/downward direction are referred for convenience of description, and can be directions that are perpendicular to each other. However, the directions are determined relatively to a direction, in which the moving body is disposed, and the upward/downward direction does not always mean a vertical direction.

Figure 2:
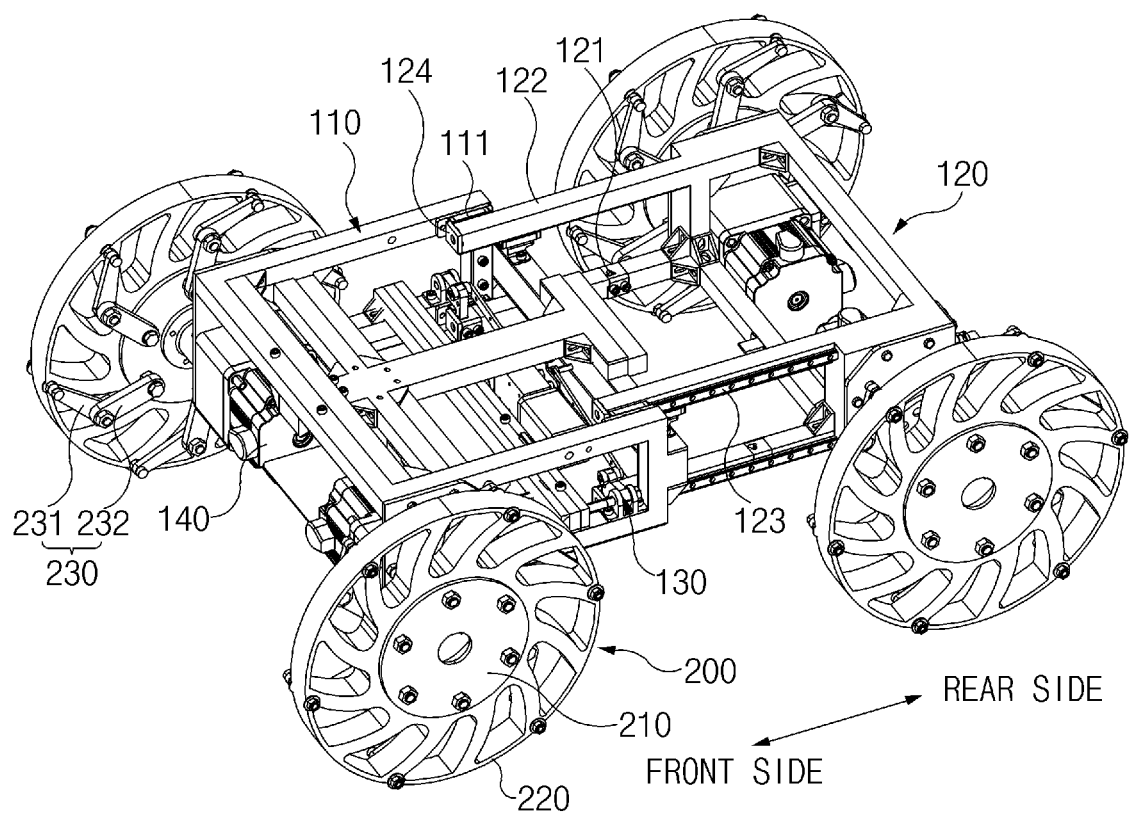
FIG. 2 is a view illustrating an example state of a second body part in FIG. 1 that is moved rearwards.
Figure 3:
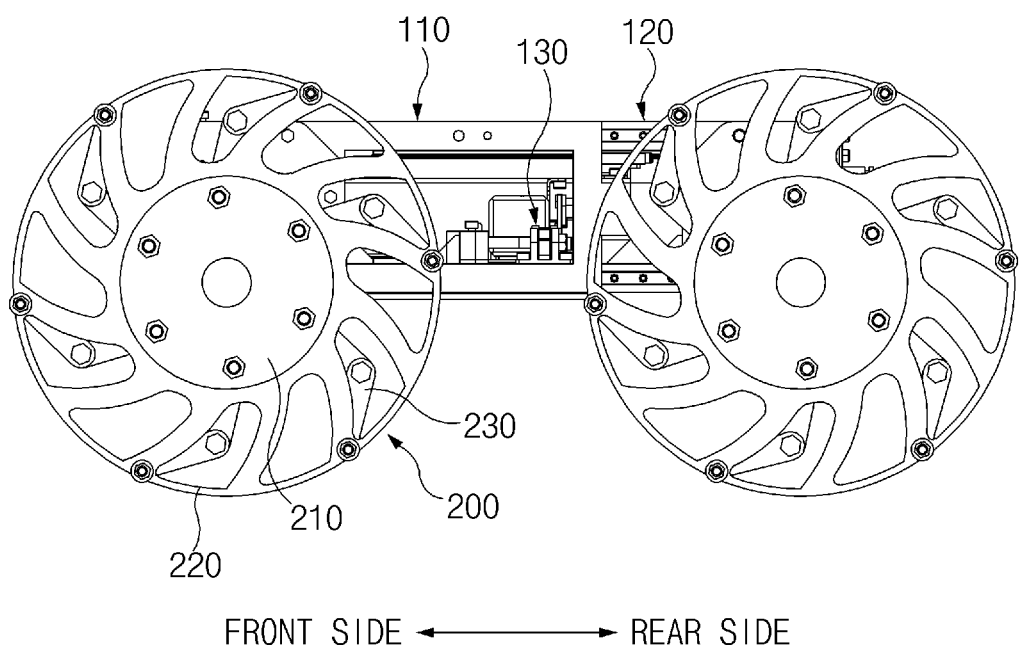
FIG. 3 is a view illustrating an appearance of the moving body when viewed from a left side.
Figure 4:
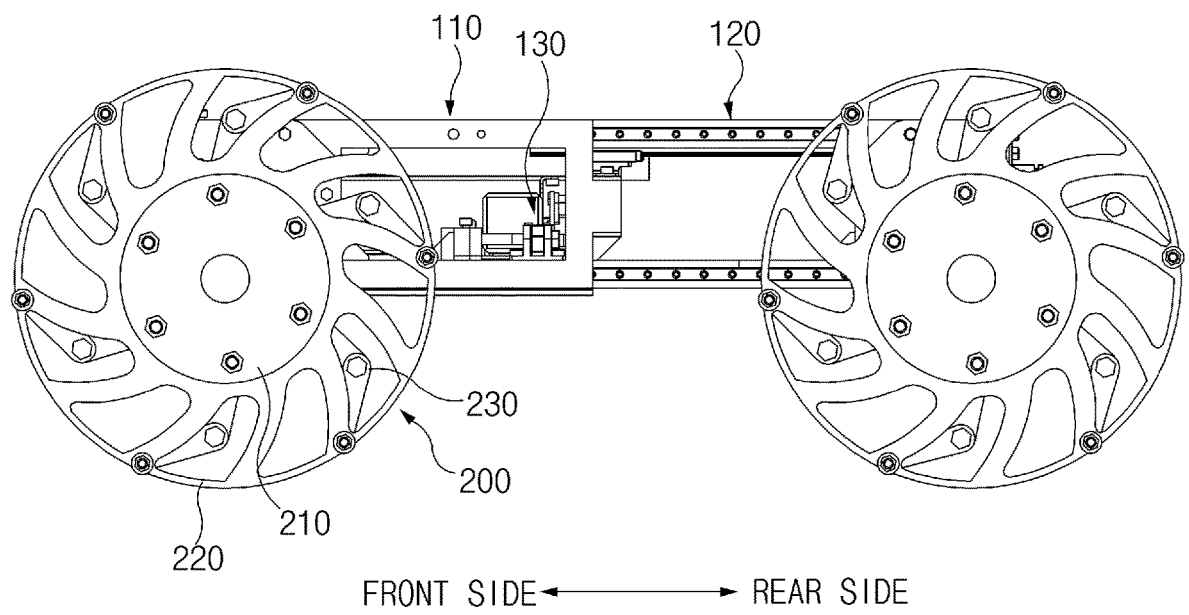
FIG. 4 is a view illustrating an example state of the second body part in FIG. 3 that is moved rearwards.

FIG. 1 is a perspective view illustrating an example of a moving body. FIG. 2 is a view illustrating an example state, of a second body part in FIG. 1 that is moved rearwards. FIG. 3 is a view illustrating an appearance of the moving body when viewed from a left side. FIG. 4 is a view illustrating a state, in which the second body part in FIG. 3 is moved rearwards.

In some implementations, the moving body can include a body 100 and wheels 200. A forward/rearward length of the body 100 can be adjusted.

Figure 5:
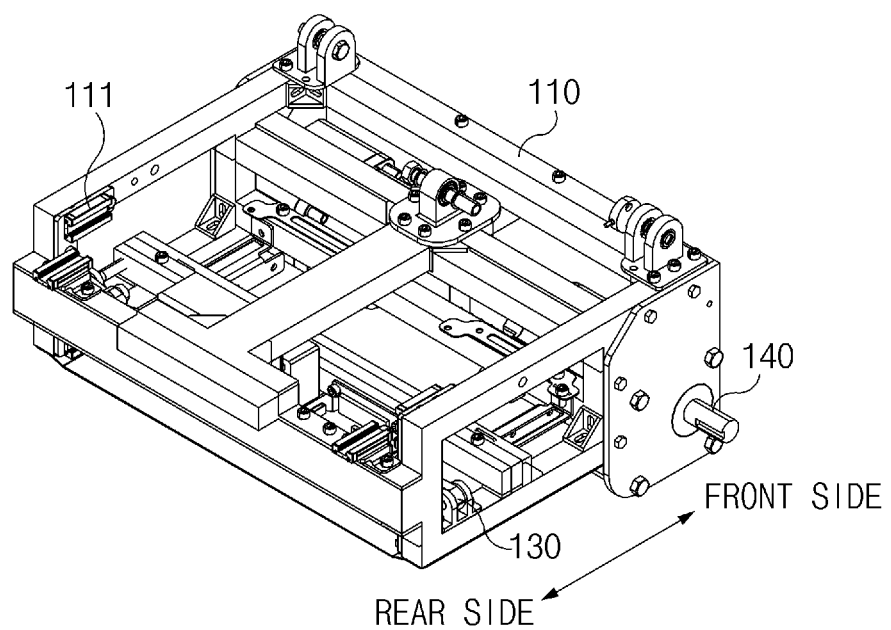
FIG. 5 is a view illustrating an example of a first body part.
Figure 6:
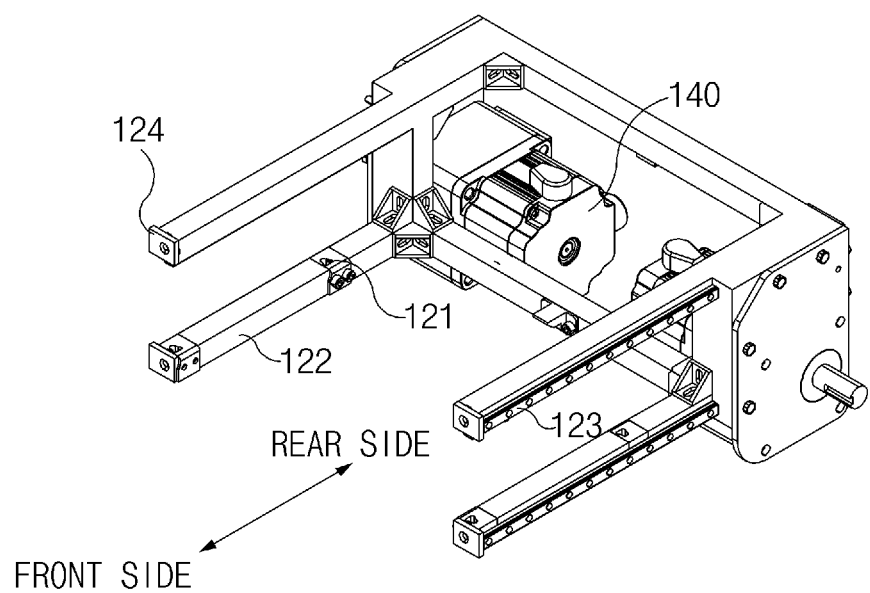
FIG. 6 is a view illustrating an example of the second body part.
Figure 7:
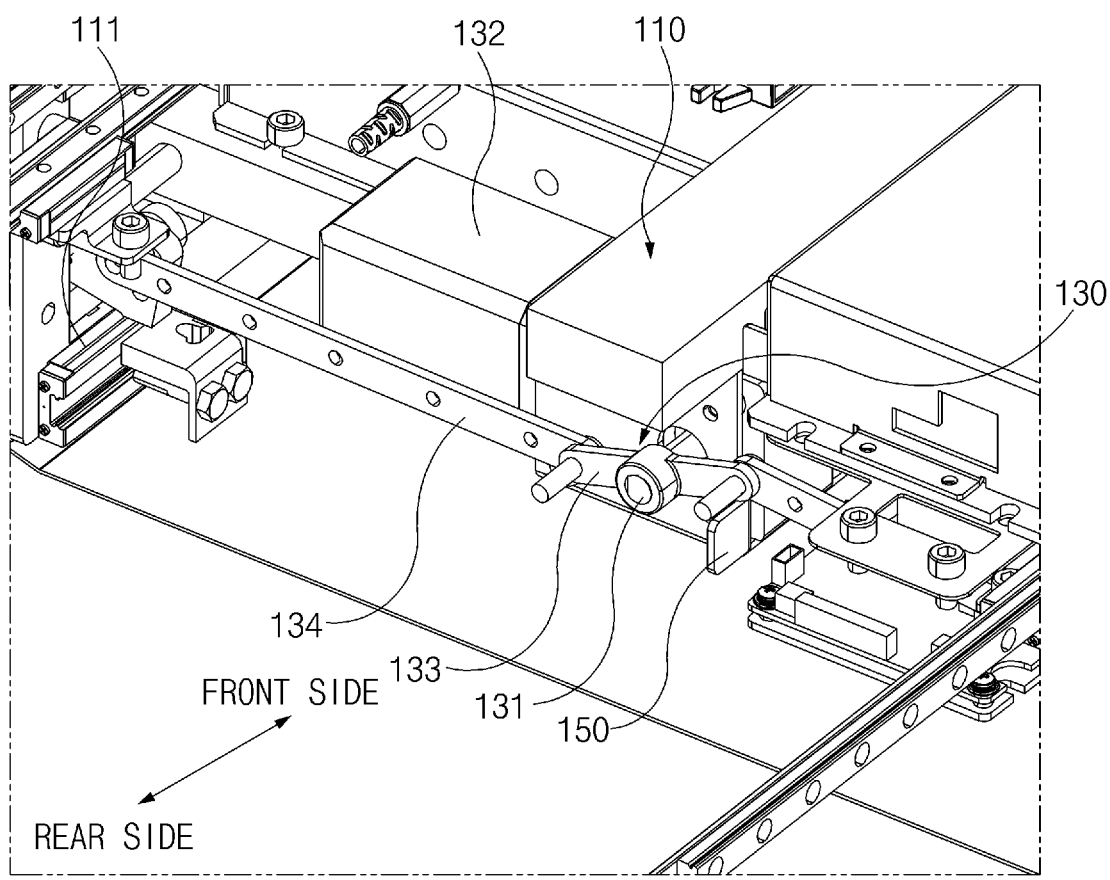
FIG. 7 is a view illustrating an example of a second coupling part.

The body 100 can include a first body part 110, a second body part 120, a first coupling part 121, and a second coupling part 130 (FIG. 7). The second body part 120 can be connected to the first body part 110 to be slid in a forward/rearward direction with respect to the first body part 110. FIG. 5 is a view illustrating the first body part, and FIG. 6 is a view illustrating the second body part.

The first coupling part 121 can be a configuration that is coupled to the second coupling part 130 (FIG. 7) to adjust a forward/rearward length of the body 100.

A portion of the second coupling part 130 (FIG. 7) is coupled to any one of the first coupling part 121 formed in the first body part 110 or the second body part 120 to constrain sliding between the first body part 110 and the second body part 120. In some implementations, the first coupling part 121 can be a hole or a recess. Then, the second coupling part 130 can have a boss corresponding to the hole or the recess.

As another example, the first coupling part 121 can be a boss. Then, the second coupling part 130 can have a hole or a recess corresponding to the boss. The second coupling part 130 can function to fix a length of the body 100 to a specific length by constraining sliding between the first body part 110 and the second body part 120.

Although it will be described in the specification that the first coupling part 121 is formed in the second body part 120, it can be considered that it is formed in the first body part. Furthermore, hereinafter, a case, in which the first coupling part 121 is a hole, will be described.

The wheels 200 can be coupled to the body 100 to be rotatable. To achieve this, the body 100 can further include a wheel motor 140, to which the wheels 200 is coupled to be rotatable and which is configured to rotate the wheel 200.

The wheels 200 can be configured to be rotatable both forwardly and reversely. For example, the wheels 200 can be coupled to the wheel motors 140 in one-to-one correspondence. The wheels 200 can have front wheels and rear wheels. The front wheels can be coupled to the first body part 110. The rear wheels can be coupled to the second body part 120. At least one of the front wheels and the rear wheels can be one pair.

The wheels 200 can be wheels 200 that can be moved not on a flat surface but on a ground surface, including stairs. In some implementations, as illustrated in FIG. 1, each of the wheels 200 can include a frame 210, spokes 220, and a connection part 230.

The frame 210 can be coupled to a rotary shaft of the wheel motor 140 to be rotatable. The spokes 220 can be configured to surround the frame 210. In some implementations, the spoke 220 can include a pair of cylindrical or disk-shaped members, diameters of which are different and centers of which are the same, and members that connect them.

The connection part 230 can be configured to connect the frame 210 and the spoke 220. The connection part 230 can have a structure, in which a length thereof can vary along a radial direction of the frame 210. A length of the spoke 220 along the radial direction of the frame 210 can vary in correspondence to a length of the connection part 230 along the radial direction of the frame 210.

For example, the connection part 230 can include a first connection member 231, one side of which is coupled to a radially outer side of the spoke 220, and a second connection member 232, one side of which is coupled to a radially inner side of the frame 210, and the first connection member 231 and the second connection member 232 can be coupled to each other to be rotatable.

A plurality of first coupling parts 121 can be formed in the second body part 120. Furthermore, the second body part 120 can include an extension 122 and a protrusion 123.

The extension 122 can extend in a forward/rearward direction. For example, a plurality of extensions 122 can be formed, and the plurality of first coupling parts 121 can be formed in at least any one of the plurality of extensions 122. Then, the plurality of first coupling parts 121 can be arranged along the forward/rearward direction.

In some implementations, four extensions 122 can be provided. Then, in some implementations, the plurality of first coupling parts 121 can be formed in, among the extensions 122, two extensions 122 located on a lower side, along the forward/rearward direction.

The protrusion 123 can protrude from the extension 122 and extend in the forward/rearward direction. For example, one protrusion 123 can protrude from one extension 122. As another example, two protrusions that protrude in different directions can be formed in some of the extensions 122. In some implementations, the protrusions 123 can be provided on left and right surfaces and upper and lower surfaces of the extension 122.

The first body part 110 can include a guide 111. The protrusion 123 can be seated in the guide 111 to be slid in the forward/rearward direction. To achieve this, the guides 111 can be provided to correspond to the number and the locations of the protrusions 123. The guide 111 can guide the protrusion 123 to guide forward/rearward movement of the extension 122. Then, a relative movement of the extension 122 and the guide 111 in the forward/rearward direction can be generated through driving of the front wheels or rear wheels.

The first body part 110 can be formed such that a forward/rearward length thereof is larger than a forward/rearward length of the extension 122 such that a front distal end of the extension 122 is prevented from protrude to a front side of the first body part 110 when the extension 122 is slid forwards and rearwards.

In some examples, the second body part 120 can further include a stopper 124. The stopper 124 can be coupled to the front distal end of the extension 122, and can include an area that overlaps the guide 111 when viewed along the forward/rearward direction. The stopper 124 can be a configuration for contacting a front side of the guide 111 when the extension 122 is moved rearwards to constrict rearward movement of the extension 122 so as to prevent the first body part 110 and the second body part 120 from being separated from each other.

Figure 8:
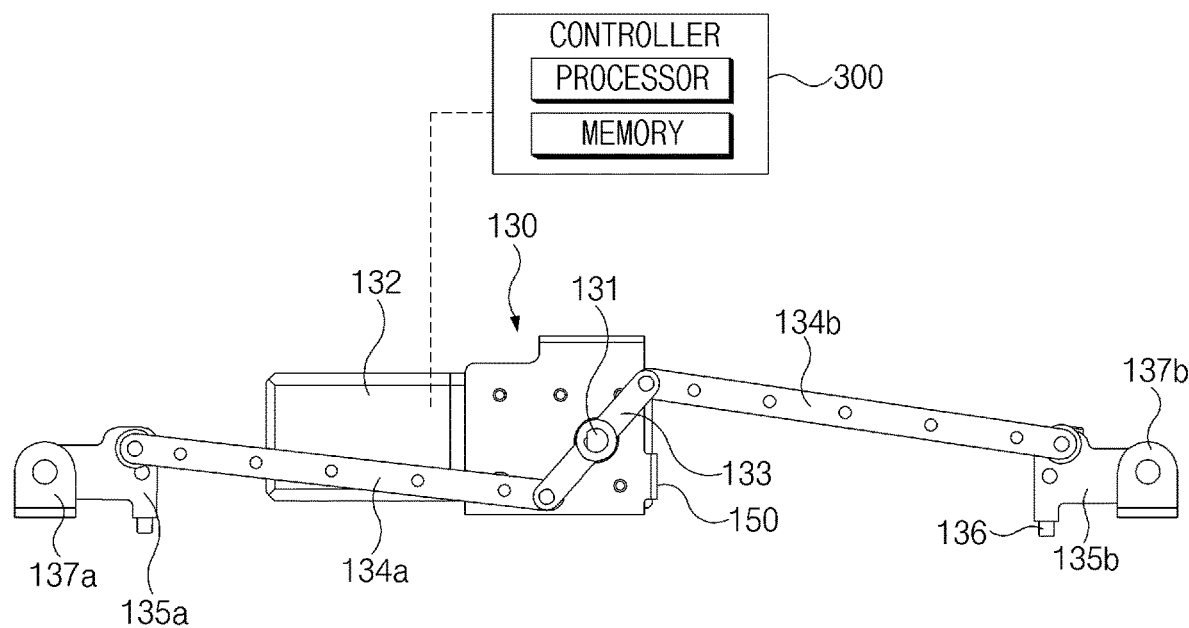
FIG. 8 is a view illustrating an example of the second coupling part when the second coupling part constrains sliding of the second body part, when viewed from a rear side.
Figure 9:
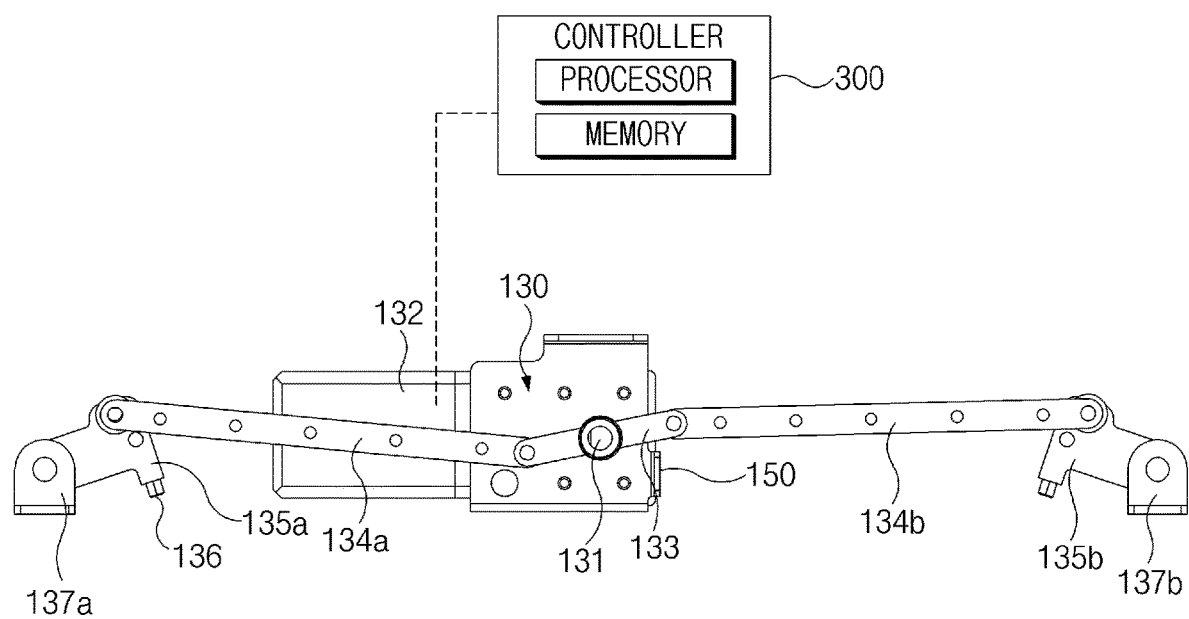
FIG. 9 is a view illustrating an example of the second coupling part when the second coupling part allows sliding of a second body part, when viewed from a rear side.

FIG. 7 is a view illustrating the second coupling part. FIG. 8 is a view illustrating an appearance of the second coupling part when the second coupling part constrains sliding of the second body part, when viewed from a rear side. FIG. 9 is a view illustrating an appearance of the second coupling part when the second coupling part allows sliding of the second body part, when viewed from a rear side.

Hereinafter, referring to FIGS. 7 to 9, an example of the second coupling part 130 that constrains sliding between the first body part 110 and the second body part 120 will be described in detail. According to the moving body, a forward/rearward length of the body 100 can be adjusted due to presence of the second coupling part 130.

However, a detailed structure of the second coupling part 130 is not limited in the contents that will be descried below, but various modifications can be made as long as the sliding between the first body part 110 and the second body part 120 can be selectively performed.

The second coupling part 130 can include a shaft 131, a motor 132, and a coupler 135. The shaft 131 can extend in a specific direction. In some implementations, the specific direction can be the forward/rearward direction. The motor 132 can be configured to rotate the shaft 131 about a specific direction.

The coupler 135 can be moved in conjunction with rotation of the shaft 131. The coupler 135 can be coupled to the first coupling part 121 to constrain sliding between the first body part 110 and the second body part 120.

In some implementations, the coupler 135 can have a boss area 136. The boss area 136 can be configured to be inserted into or separated from any one of the plurality of first coupling part 121 as the shaft 131 is rotated forwardly or reversely. In some implementations, when the boss area 136 is inserted into the first coupling part 121, sliding of the second body part 120 can be prevented. When the boss area 136 is separated from the first coupling part 121, sliding of the second body part 120 can be allowed.

Figure 10:
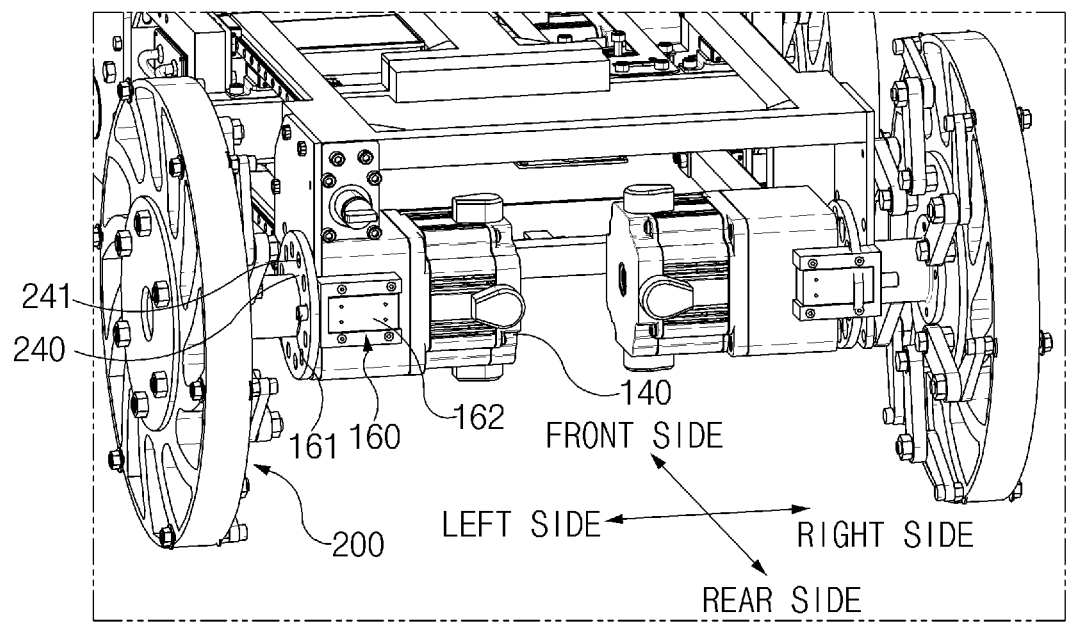
FIG. 10 is a view illustrating an example of the moving body when viewed from a rear side.

The second coupling part 130 can include a rotary member 133, a link 134, and a joint 137. The rotary member 133 can be fixedly coupled to the shaft 131 to be rotated in conjunction with rotation of the shaft 131. The link 134 can be coupled to the rotary member 133 to be rotatable, and can be coupled to the coupler 135 to be rotatable. The joint 137 can be coupled to the coupler 135 to be rotatable, and can be fixedly coupled to the first body part 110 or the second body part 120. In some implementations, as illustrated in FIGS. 9 and 10, a rotational center axis between the joint 137 and the coupler 135 and a rotational center axis between the link 134 and the coupler 135 can be provided on an outer side in the leftward/rightward direction.

In some implementations, the shaft 131 can be coupled to a lengthwise center of the rotary member 133. A pair of links 134, a pair of couplers 135, and a pair of joints 137 can be provided to be spaced apart from each other in the leftward/rightward direction. Then, the pair of links 134 can be coupled to opposite lengthwise sides of the rotary member 133 to be rotatable.

In some implementations, when viewed form a rear side, the pair of links 134 can be disposed to be dot-symmetrical to each other with respect to a center of the shaft 131. Furthermore, the pair of couplers 135 can be disposed to be line-symmetrical to each other with respect to an imaginary line extending from a center of the shaft 131 in the upward/downward direction, when viewed from a rear side.

When the motor 132 rotates the shaft 131, any one of the pair of couplers 135 can be rotated in the same direction as that of the shaft 131 and the other one of the pair of couplers 135 can be rotated in an opposite direction to that of the shaft 131.

Furthermore, a rotation constraining area 150 that is disposed on a rotation radius side of the rotary member 133 and that constrains rotation of the rotary member 133 within a specific range can be formed.

In some examples, when the rotary member 133 tends to rotate continuously even after the rotary member 133 contacts the rotation constraining area 150, the rotary member 133 can be damaged or deformed. Accordingly, a rotation degree of the rotary member 133 is configured to be adjusted. For example, the motor 132 can be connected to a controller 300 to adjust the rotation degree of the rotary member 133.

In some implementations, the controller 300 can be configured to perform a control such that the rotation degree of the rotary member 133 is adjusted. This can mean that the rotation degree of the shaft 131 can be adjusted by the controller 300. The controller 300 can include a processor and a memory. The processor can include a microprocessor such as a field Programmable gate array (FPGA), an application specific integrated circuit (ASIC), a central processing unit (CPU). The memory can store control instructions that are basic in generating instructions for determining the rotation degree of the shaft 131, by the processor. The memory can be data storage such as a hard disk drive (HDD), a solid state drive (SSD), a volatile medium, and a nonvolatile medium.

In some implementations, the controller 300 can adjust the rotation degree of the shaft 131 by controlling an operation time of the motor 132. As another example, the controller 300 can directly measure the rotation degree of the shaft 131 to control an operation of the motor 132. In addition, the controller 300 can control an operation of the motor 132 in a range in which the rotation degree of the shaft 131 can be adjusted.

Hereinafter, an operation of the second coupling part 130 for constraining sliding of the second body part 120 will be described in detail with reference to the drawings. This can be understood that the state of FIG. 9 is changed to the state of FIG. 8. For convenience of description, with respect to the rotary member 133 of FIG. 9, the link, the coupler, and the joint located on the left side will be referred to as a first link 134a, a first coupler 135a, and a first joint 137a, respectively, and the link, the coupler, and the joint located on the right side will be referred to as a second link 134b, a second coupler 135b, and a second joint 137b, respectively.

In a state of FIG. 9, the motor 132 rotates the shaft 131 in the counterclockwise direction. As the shaft 131 is rotated, the rotary member 133 is rotated in the counterclockwise direction. Accordingly, with reference to FIG. 9, the first link 134a is moved rightwards and the second link 134b is moved leftwards.

When the first link 134a is moved rightwards, the first coupler 135a also is pulled rightwards. Then, because a left end of the first coupler 135a is coupled to the first joint 137a, a location of which is fixed, to be rotatable, the first coupler 135a is rotated in the clockwise direction.

When the link 134b is moved leftwards, the second coupler 135b also is pulled leftwards. Then, because a right end or the second coupler 135b is coupled to the second joint 137b, a location of which is fixed, to be rotatable, the second coupler 135b is rotated in the counterclockwise direction.

As a result, the first coupler 135a can be rotated in the clockwise direction and the second coupler 135b can be rotated in the counterclockwise direction, and thus the state of FIG. 9 can be made. This can be understood that the boss area 136 is inserted into the first coupling part 121, and sliding of the second body part 120 is constrained.

In some examples, to allow the sliding of the second body part 120, a reverse process to the above-described process can be performed.

In some cases, an emergency situation, such as stop of an operation of a power source that supplies electric power to the moving body, may occur while the moving body ascends and descends on a slanted road, and an accident may occur while the moving body is moved rearwards along the slant.

Figure 11:
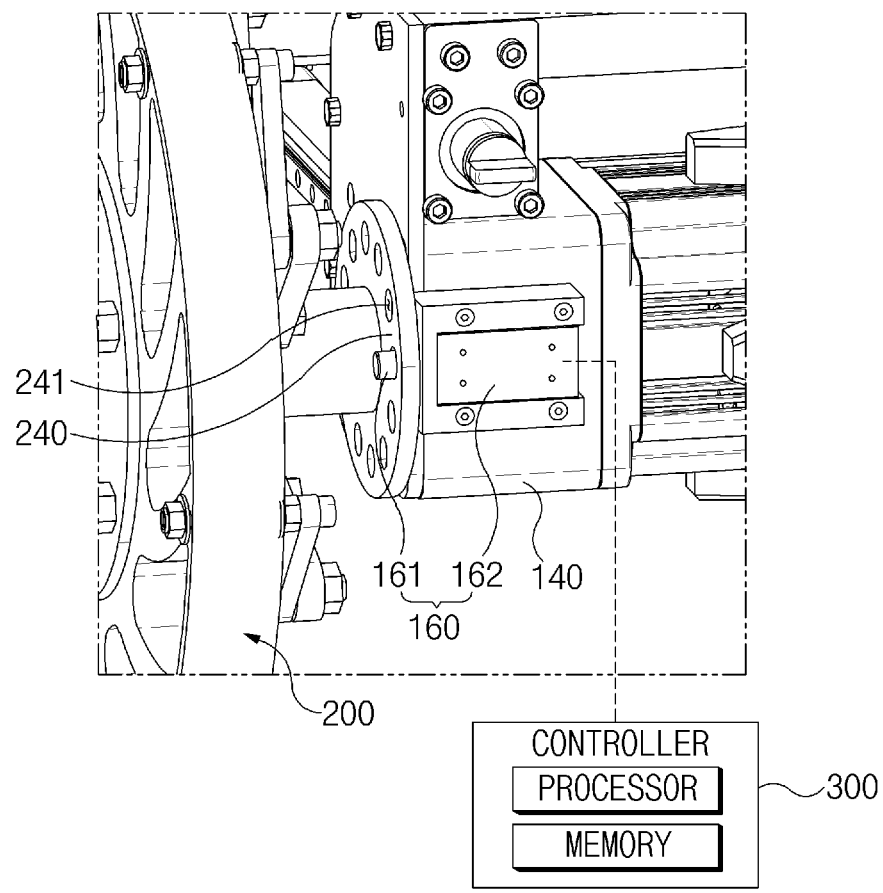
FIG. 11 is a view illustrating an example of a wheel constraining part when the wheel constraining part constrains rotation of wheels.
Figure 12:
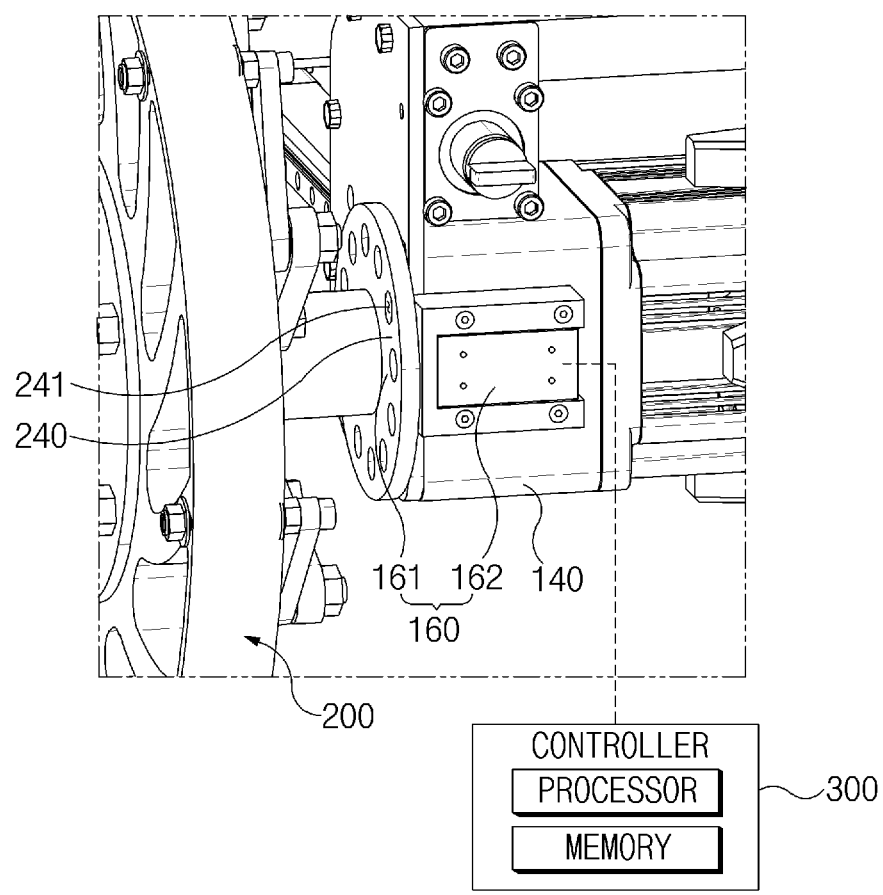
FIG. 12 is a view illustrating an example of the wheel constraining part when the wheel constraining part allows rotation of wheels.

FIG. 10 is a view illustrating an appearance of the moving body when viewed from a rear side. FIG. 11 is a view illustrating an appearance of the wheel constraining part when the wheel constraining part constrains rotation of wheels. FIG. 12 is a view illustrating an appearance of the wheel constraining part when the wheel constraining part allows rotation of the wheels. Hereinafter, a structure capable of preventing the above-described accident will be described above with reference to FIGS. 10 to 12.

The wheel 200 can include a hub 240. The hub 240 can have a plurality of insertion holes 241 that pass therethrough along the leftward/rightward direction and are arranged along a circumferential direction thereof. A center of the hub 240 can correspond to a center of the frame 210 when viewed along the leftward/rightward direction. The hub 240 can be spaced apart from the frame 210 in a direction that faces the wheel motor 140 in the leftward/rightward direction. This can mean that the hub 240 is disposed on an inner side of the frame 210.

The body 100 can further include a wheel constraining part 160. The wheel constraining part 160 can further include a pin 161 and an operation member 162. The pin 161 can be inserted into any one of the plurality of insertion holes 241 or can be spaced apart from the plurality of insertion holes 241 in the leftward/rightward direction. This can mean that the pin 161 can be inserted into the insertion hole 241. The operation member 162 can move the pin 161 in the leftward/rightward direction. For example, the operation member 162 can include a solenoid motor.

Furthermore, the operation member 162 can be coupled to the wheel motor 140. The wheel constraining part 160 can be configured to constrain rotation of any one of the front wheels and the rear wheels.

The wheel constraining part 160 can operate the pin 161 such that the pin 160 protrudes toward a direction that passes through the plurality of insertion holes 241 when supply of a current is stopped. In some implementations, the wheel constraining part 160 can have a normal open type circuit. Furthermore, the wheel constraining part 160 can be electrically connected to the controller 300 to allow the operation.

When the supply of the current is stopped, the operation member 162 of the wheel constraining part 160 moves the pin 161 to insert the pin 161 into any one of the plurality of insertion holes 241 of the hub 240. In this case, the rotation of the wheels 200 can be restrained and thus a safety in an emergency situation can be secured.

According to the present disclosure, the body includes the first body part and the second body part, which are connected to each other to be slid, and relative locations thereof can be fixed, and thus, a forward/rearward length of the body can be adjusted.

In addition, according to the present disclosure, when the supply of the electric power is stopped, the pin can protrude to be inserted into the insertion hole famed in the wheel to stop rotation of the wheel, and thus a danger of an accident can be reduced even when the supply of the electric power is stopped.

The above description is a simple exemplification of the technical spirits of the present disclosure, and the present disclosure can be variously corrected and modified by those skilled in the art to which the present disclosure pertains without departing from the essential features of the present disclosure. Accordingly, the implementations disclosed in the present disclosure is not provided to limit the technical spirits of the present disclosure but provided to describe the present disclosure, and the scope of the technical spirits of the present disclosure is not limited by the implementations. Accordingly, the technical scope of the present disclosure should be construed by the attached claims, and all the technical spirits within the equivalent ranges fall within the scope of the present disclosure.

What is claimed is:

1. A moving body comprising:
    a body; and
    a wheel coupled to the body and configured to rotate relative to the body,
    wherein the body comprises:
        a first body part,
        a second body part connected to the first body part and configured to move in a forward/rearward direction with respect to the first body part,
        a first coupling part disposed at the first body part or the second body part, and
        a second coupling part coupled to the first coupling part and configured to restrict a sliding movement between the first body part and the second body part,
    wherein the first coupling part comprises a hole, a recess, or a boss, and
    wherein the second coupling part comprises:
        a shaft that extends in a longitudinal direction,
        a motor configured to rotate the shaft about the longitudinal direction, and
        a coupler configured to operate based on rotation of the shaft and configured to be coupled to or separated from the first coupling part based on a rotational direction of the shaft, the coupler comprising a part that is inserted into the hole or the recess or a part that receives the boss.

2. The moving body of claim 1, wherein the second coupling part comprises:
    a rotary member coupled to the shaft and configured to rotate based on rotation of the shaft;
    a link coupled to the rotary member and to the coupler, the link being configured to move based on rotation of the rotary member; and
    a joint coupled to the coupler and configured to rotate relative to the coupler, the joint being fixedly coupled to the first body part or the second body part.

3. The moving body of claim 2, wherein the shaft is coupled to a lengthwise center of the rotary member,
    wherein the link is one of a pair of links that are spaced apart from each other in a leftward/rightward direction,
    wherein the coupler is one of a pair of couplers that are spaced apart from each other in the leftward/rightward direction,
    wherein the joint is one of a pair of joints that are spaced apart from each other in the leftward/rightward direction, and
    wherein the pair of links are coupled to opposite lengthwise sides of the rotary member and configured to move based on rotation of the rotary member.

4. The moving body of claim 3, wherein one of the pair of couplers is configured to, based on the motor rotating the shaft in a first rotational direction, rotate in the first rotational direction, and
    wherein the other one of the pair of couplers is configured to, based on the motor rotating the shaft in the first rotational direction, rotate in a second rotational opposite to the first rotational direction.

5. The moving body of claim 3, wherein the pair of links are disposed symmetrical to each other with respect to a center of the shaft.

6. The moving body of claim 3, wherein the pair of couplers are disposed symmetrical to each other with respect to a reference line extending from a center of the shaft in an upward/downward direction.

7. The moving body of claim 3, further comprising a rotation constraining area that is disposed at a rotation path of the rotary member and configured to limit a range of rotation of the rotary member.

8. The moving body of claim 1, wherein the body further comprises a wheel motor coupled to the wheel and configured to rotate the wheel.

9. A moving body comprising:
    a body; and
    a wheel coupled to the body and configured to rotate relative to the body,
    wherein the body comprises:
        a first body part,
        a second body part connected to the first body part and configured to move in a forward/rearward direction with respect to the first body part,
        a first coupling part disposed at the first body part or the second body part, and
        a second coupling part coupled to the first coupling part and configured to restrict a sliding movement between the first body part and the second body part,
    wherein the first coupling part is disposed at the second body part,
    wherein the second body part comprises:
        an extension that extends in the forward/rearward direction, and
        a protrusion that protrudes from the extension and extends in the forward/rearward direction, and
    wherein the first body part further comprises a guide that supports the protrusion, the protrusion being configured to slide on the guide in the forward/rearward direction.

10. The moving body of claim 9, wherein the extension is one of a plurality of extensions disposed at the second body part, and
    wherein the first coupling part is disposed at at least one of the plurality of extensions.

11. The moving body of claim 9, wherein the second body part further comprises a stopper coupled to a front distal end of the extension, the stopper comprising an area that overlaps with the guide along the forward/rearward direction, and
    wherein the stopper is configured to, based on the extension moving rearward, contact a front side of the guide to thereby limit a reward movement of the extension.

12. The moving body of claim 8, wherein the wheel comprises:
    a hub that defines a plurality of insertion holes, the plurality of insertion holes passing through the hub in a leftward/right direction and being arranged along a circumferential direction of the hub, and
    wherein the body further comprises:
        a wheel constraining part comprising a pin, the pin being configured to be inserted into any one of the plurality of insertion holes or separated from the plurality of insertion holes in a leftward/rightward direction, and
        an operation member configured to move the pin in the leftward/rightward direction.

13. The moving body of claim 12, wherein the wheel constraining part is configured to, based on supply of an electric current to the wheel motor being stopped, operate the operation member such that the pin protrudes in a direction that passes through the plurality of insertion holes.

14. The moving body of claim 12, wherein the wheel further comprises:
- a frame coupled to a rotary shaft of the wheel motor and configured to rotate based on the rotary shaft of the wheel motor; and
- a spoke disposed around the frame,
- wherein a center of the hub corresponds to a center of the frame, and
- wherein the hub is spaced apart from the frame along a direction of the rotary shaft of the wheel motor.

15. The moving body of claim 12, wherein the operation member is coupled to the wheel motor.

16. The moving body of claim 14, wherein the wheel further comprises a connection part that connects the frame and the spoke to each other, and
- wherein a length of the spoke in a radial direction of the frame is configured to vary based on a length of the connection part varying in the radial direction of the frame.

17. A moving body comprising:
- a body; and
- a wheel coupled to the body and configured to rotate relative to the body,
- wherein the body comprises:
  - a first body part,
  - a second body part connected to the first body part and configured to move in a forward/rearward direction with respect to the first body part,
  - a first coupling part disposed at the first body part or the second body part,
  - a second coupling part coupled to the first coupling part and configured to restrict a sliding movement between the first body part and the second body part, and
  - a wheel motor coupled to the wheel and configured to rotate the wheel, wherein the wheel comprises:
    - a hub that defines a plurality of insertion holes, the plurality of insertion holes passing through the hub in a leftward/right direction and being arranged along a circumferential direction of the hub, and
  - wherein the body further comprises:
    - a wheel constraining part comprising a pin, the pin being configured to be inserted into any one of the plurality of insertion holes or separated from the plurality of insertion holes in a leftward/rightward direction, and
    - an operation member configured to move the pin in the leftward/rightward direction.

* * * * *